US011929041B1

(12) United States Patent
Huang et al.

(10) Patent No.: US 11,929,041 B1
(45) Date of Patent: Mar. 12, 2024

(54) DISPLAY APPARATUS, LOCAL DIMMING CONTROL CIRCUIT AND LOCAL DIMMING CONTROL METHOD THEREOF

(71) Applicant: HIMAX TECHNOLOGIES LIMITED, Tainan (TW)

(72) Inventors: Chao Chen Huang, Tainan (TW); Tsai Hsing Chen, Tainan (TW); Cheng Che Tsai, Tainan (TW); Ching-Wen Wang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/059,956

(22) Filed: Nov. 29, 2022

(51) Int. Cl.
*G09G 3/36* (2006.01)
*G09G 3/34* (2006.01)
*G09G 5/02* (2006.01)

(52) U.S. Cl.
CPC ......... *G09G 3/3413* (2013.01); *G09G 3/3611* (2013.01); *G09G 2320/0646* (2013.01); *G09G 2360/16* (2013.01)

(58) Field of Classification Search
CPC ..................... G09G 2320/0646; G09G 3/3426
See application file for complete search history.

(56) References Cited

U.S. PATENT DOCUMENTS

2009/0160877 A1* 6/2009 Peng .................... G09G 3/3426 345/87
2011/0227940 A1* 9/2011 Neal .................... G09G 3/3426 345/589
2017/0148393 A1* 5/2017 Peana .................. G09G 3/3426

* cited by examiner

*Primary Examiner* — Nan-Ying Yang
(74) *Attorney, Agent, or Firm* — CKC & Partners Co., LLC

(57) ABSTRACT

A display apparatus includes a backlight module with backlight zones, a panel over the backlight module, and a circuit configured to generate compensated pixel data for the panel based on image data and an arrangement of the zones of the backlight module, in which the image data has image areas respectively corresponding to the backlight zones. For a first image area being a low-luminance image area and a luminance intensity of a first zone of the zones corresponding to the first image area being less than a luminance intensity of a second zone corresponding to a second image area neighboring the first image area, the circuit performs first pixel compensation for high-luminance pixels in the second image area and second pixel compensation on low-luminance pixels in the second image area, in which the second pixel compensation is greater than the first pixel compensation.

12 Claims, 7 Drawing Sheets

DISPLAY APPARATUS, LOCAL DIMMING CONTROL CIRCUIT AND LOCAL DIMMING CONTROL METHOD THEREOF

BACKGROUND

Field of the Invention

The invention relates to local dimming, and more particularly to a display apparatus, a local dimming control circuit and a local dimming function for image display without dark halo phenomenon.

Description of Related Art

A conventional liquid crystal display (LCD) device normally includes a backlight module for providing a backlight source in order to display images. Furthermore, a local dimming technology may be applied to the backlight module to increase the contrast of the LCD device, in which the backlight luminance intensities of specific parts are determined according to the gray level distribution of an image to be displayed. In some examples, for displaying a high gray level portion of an image, the corresponding part of the backlight module will output light with relatively high luminance; for displaying a low gray level portion of an image, the corresponding part of the backlight module will output light with relatively low luminance.

SUMMARY

One aspect of the invention directs to a display apparatus which includes a backlight module with backlight zones, a liquid crystal display (LCD) panel over the backlight module, and a local dimming control circuit. The local dimming control circuit is configured to generate a local dimming data signal for the backlight module and compensated pixel data for the LCD panel based on image data and an arrangement of the backlight zones of the backlight module. The image data has a plurality of image areas respectively corresponding to the backlight zones. For a first image area of the image areas being a low-luminance image area and a luminance intensity of a first backlight zone of the backlight zones corresponding to the first image area being less than a luminance intensity of a second backlight zone corresponding to a second image area of the image areas neighboring the first image area, the local dimming control circuit performs first pixel compensation for high-luminance pixels in the second image area and second pixel compensation for low-luminance pixels in the second image area, in which the second pixel compensation is greater than the first pixel compensation.

In accordance with one or more embodiments of the invention, the local dimming control circuit includes a backlight luminance calculator and a pixel compensator. The backlight luminance calculator performs local dimming configuration by calculating a luminance table with luminance values respectively corresponding to the backlight zones from the image data to generate the local dimming data signal. The pixel compensator performs the first and second pixel compensations on the image data according to the luminance table to generate the compensated pixel data.

In accordance with one or more embodiments of the invention, the pixel compensator performs the first pixel compensation by multiplying a first gray level of the high-luminance pixels in the second image area with a first compensation gain and performs the second pixel compensation by multiplying a second gray level of the low-luminance pixels in the second image area with a second compensation gain which is greater than the first compensation gain.

In accordance with one or more embodiments of the invention, the first compensation gain is determined based on the luminance values for the backlight zones.

In accordance with one or more embodiments of the invention, the second compensation gain is positively correlated with the number of high-luminance pixels in the second image area.

In accordance with one or more embodiments of the invention, the local dimming data signal has pulse-width modulation (PWM) duty cycle values respectively corresponding to the backlight zones of the backlight module.

In accordance with one or more embodiments of the invention, the local dimming control circuit is integrated in a timing controller of the display apparatus.

In accordance with one or more embodiments of the invention, each backlight zone of the backlight module has a plurality of light emitting diodes (LED).

Another aspect of the invention is directed to a local dimming control circuit which includes a backlight luminance calculator and a pixel compensator. The backlight luminance calculator is configured to generate a local dimming data signal for the backlight module and compensated pixel data for a LCD panel based on image data and an arrangement of the backlight zones of a backlight module associated with the LCD panel. The image data having a plurality of image areas respectively corresponding to the backlight zones. The pixel compensator is configured to determine whether a first image area of the image areas is a low-luminance image area and, in response to a determination that the first image area is a low-luminance image area and a luminance intensity of a first backlight zone of the backlight zones corresponding to the first image area is less than a luminance intensity of a second backlight zone corresponding to a second image area of the image areas neighboring the first image area, perform first pixel compensation for high-luminance pixels in the second image area and second pixel compensation for low-luminance pixels in the second image area, in which the second pixel compensation is greater than the first pixel compensation.

In accordance with one or more embodiments of the invention, the backlight luminance calculator performs local dimming configuration by calculating a luminance table with luminance values respectively corresponding to the backlight zones from the image data to generate the local dimming data signal, and wherein the pixel compensator performs the first and second pixel compensations on the image data according to the luminance table to generate the compensated pixel data.

In accordance with one or more embodiments of the invention, the pixel compensator performs the first pixel compensation by multiplying a first gray level of the high-luminance pixels in the second image area with a first compensation gain and performs the second pixel compensation by multiplying a second gray level of the low-luminance pixels in the second image area with a second compensation gain which is greater than the first compensation gain.

In accordance with one or more embodiments of the invention, the first compensation gain is determined based on luminance values for the backlight zones.

In accordance with one or more embodiments of the invention, the second compensation gain is positively correlated with the number of high-luminance pixels in the second image area.

In accordance with one or more embodiments of the invention, the local dimming data signal has PWM duty cycle values respectively corresponding to the backlight zones of the backlight module.

Yet another aspect of the invention is directed to a local dimming control method for a display apparatus having an LCD panel and a backlight module with a plurality of backlight zones. The local dimming control method includes: generating a local dimming data signal for the backlight module and compensated pixel data for a LCD panel based on image data and an arrangement of the backlight zones of a backlight module associated with the LCD panel, the image data having a plurality of image areas respectively corresponding to the backlight zones; determining whether a first image area of the image areas is a low-luminance image area; and in response to a determination that the first image area is a low-luminance image area and a luminance intensity of a first backlight zone of the backlight zones corresponding to the first image area is less than a luminance intensity of a second backlight zone corresponding to a second image area of the image areas neighboring the first image area, performing first pixel compensation for high-luminance pixels in the second image area, and performing second pixel compensation for low-luminance pixels in the second image area, in which the second pixel compensation is greater than the first pixel compensation.

In accordance with one or more embodiments of the invention, the first pixel compensation is performed by multiplying a first gray level of the high-luminance pixels in the second image area with a first compensation gain, and wherein the second pixel compensation is performed by multiplying a second gray level of the low-luminance pixels in the second image area with a second compensation gain which is greater than the first compensation gain.

In accordance with one or more embodiments of the invention, the first compensation gain is determined based on luminance values for the backlight zones.

In accordance with one or more embodiments of the invention, the second compensation gain is positively correlated with the number of high-luminance pixels in the second image area.

In accordance with one or more embodiments of the invention, the image data is an image with one or more bright objects and a dark background.

In accordance with one or more embodiments of the invention, the local dimming data signal has PWM cycle values respectively corresponding to the backlight zones of the backlight module.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

The detailed explanation of the invention is described as following. The described preferred embodiments are presented for purposes of illustrations and description, and they are not intended to limit the scope of the invention.

Terms used herein are only used to describe the specific embodiments, which are not used to limit the claims appended herewith. Unless limited otherwise, the term "a," "an," "one" or "the" of the single form may also represent the plural form.

Figure 1:
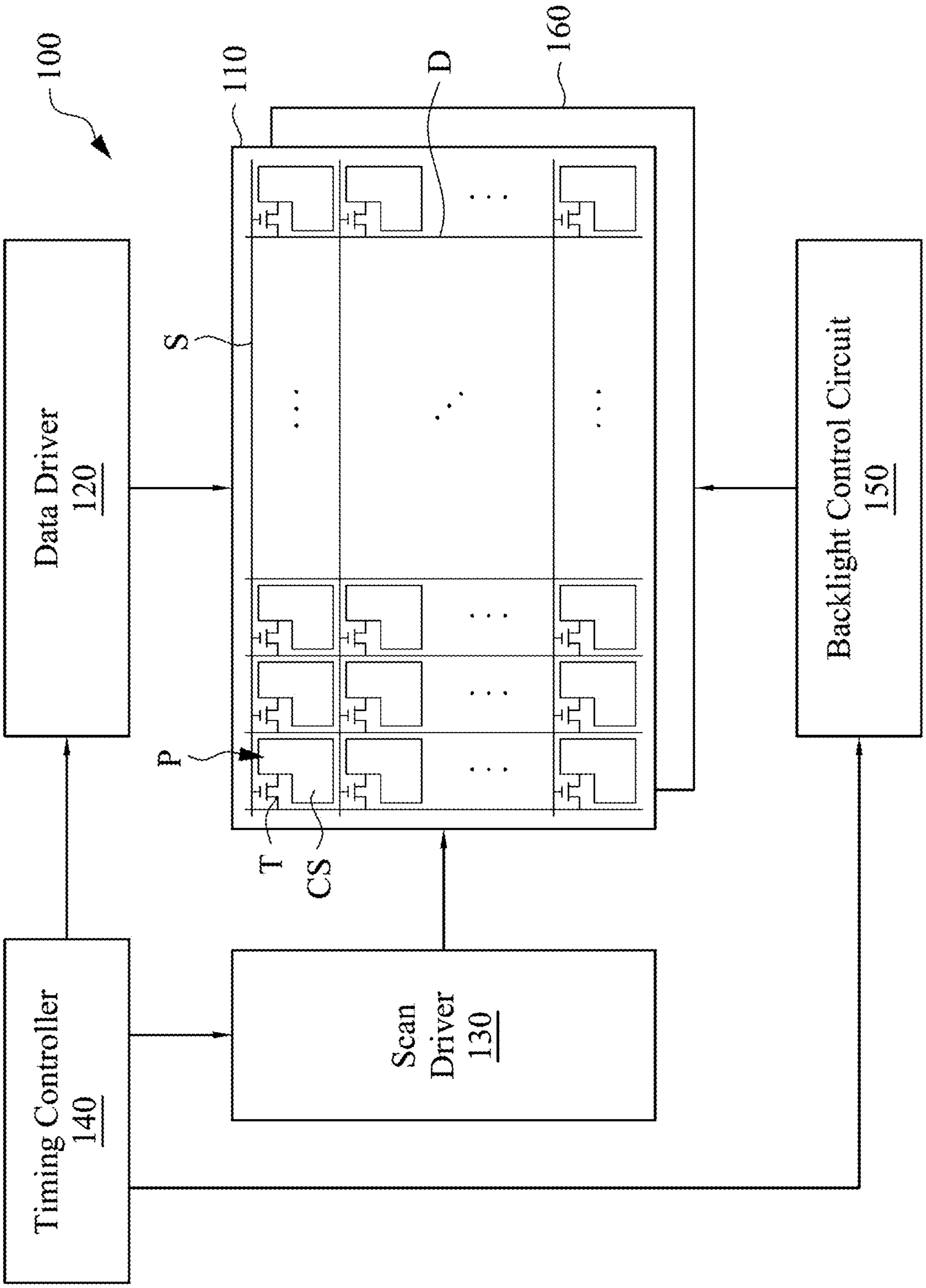
FIG. 1 is a schematic diagram of a display apparatus according to one or more embodiments of the invention.

FIG. 1 is a schematic diagram of a display apparatus 100 according to one or more embodiments of the invention. The display apparatus 100 includes a liquid crystal display (LCD) panel 110, a data driver 120, a scan driver 130, a timing controller 140, a backlight control circuit 150 and a backlight module 160. The LCD panel 110 may be, for example, in a twisted nematic (TN) mode, in-plane switching (IPS) mode or any other suitable mode. In addition, the LCD panel 110 includes a plurality of pixel units P, a plurality of data lines D, and a plurality of scanning lines S. In the LCD panel 110, the pixel units P form a matrix of rows and columns. Each pixel unit P includes a switch element T that is driven by a data line D and a scan line S to be turned on for a specific time interval, such that the storage capacitor CS is charged for displaying the corresponding gray level. The data driver 120 is configured to generate data driving signals to respectively drive the data lines D to transmit gray level data to the columns of pixel units P. The scan driver 130 is configured to generate scan driving signals to drive the scan lines S to control the switching status of the switch elements T of the pixel units P. For each pixel unit, the switching status of the switch element T is turned on during a certain time period, so that the pixel unit P displays the corresponding gray level. Using the principle of visual persistence, the human eye can see the complete image in the display area of the LCD panel 110. The timing controller 140 is configured to control the scan driver 130 to sequentially drive the scan lines S of the LCD panel 110, and to control the data driver 120 to sequentially send the corresponding image data to the LCD panel 110 when the scan lines S are sequentially driven.

The timing controller 140 is also configured to direct the backlight control circuit 150 to control the backlight module 160. The backlight control circuit 150 may be implemented as a microcontroller. The backlight module 160 is arranged in back of the LCD panel 110 for providing light source to the LCD panel 110. The backlight module 160 may be a direct type backlight module in which light source is arranged at the back side thereof and no light guide plate is needed. In some embodiments, the backlight module 160 is separated into backlight zones arranged in an array and each having light emitting diodes (LED) for providing backlight.

In some embodiments, the data driver 120, the scan driver 130 and the timing controller 140 are integrated into a single integrated chip. Furthermore, in certain embodiments, the chip integrating the functions of the data driver 120, the scan driver 130 and the timing controller 140 may also provide touch detection function for the LCD panel 110 with an in-cell touch sensor structure or a touch panel disposed over the LCD panel 110.

Figure 2:
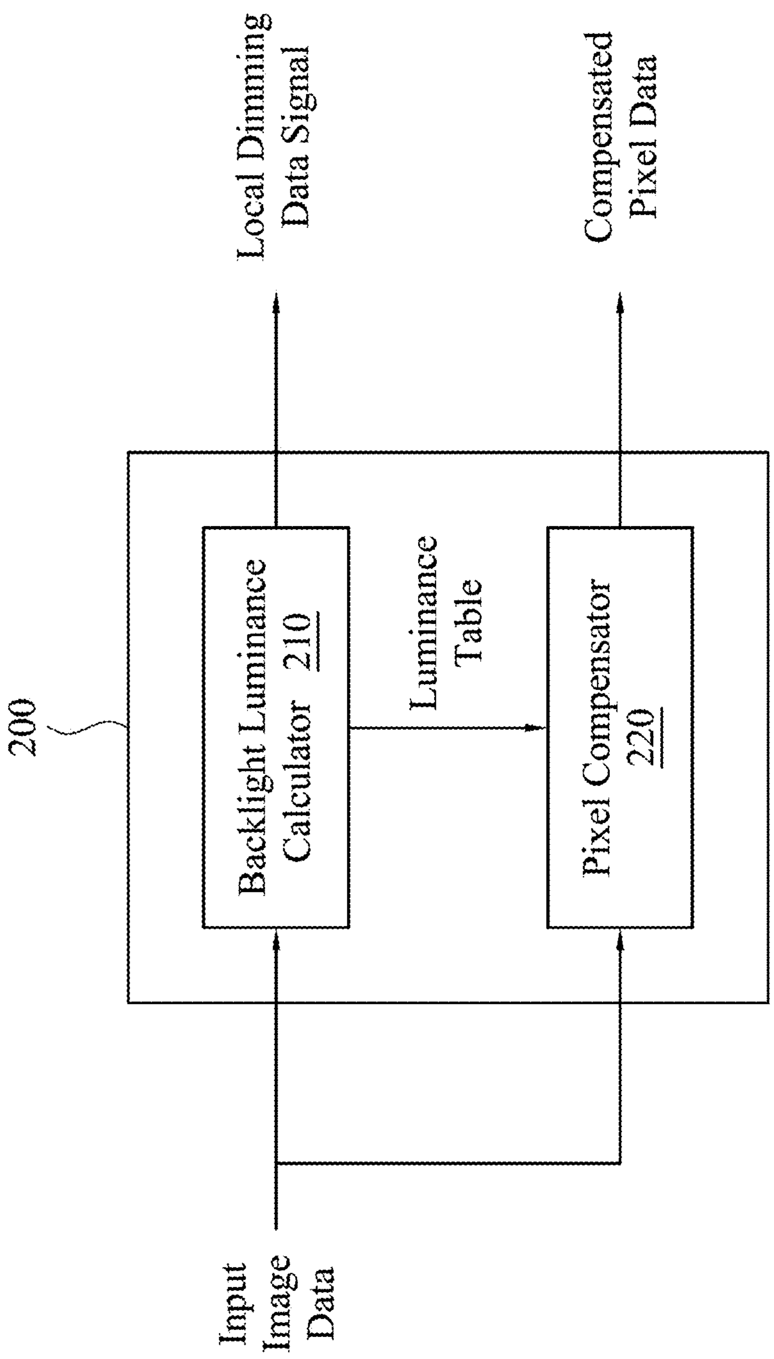
FIG. 2 is a local dimming control circuit in accordance with some embodiments of the invention.

FIG. 2 is a local dimming control circuit 200 in accordance with some embodiments of the invention. The local dimming control circuit 200 may be a circuit embedded in the timing controller 140 or externally connected with the timing controller 140. The local dimming control circuit 200 includes a backlight luminance calculator 210 and a pixel compensator 220. The backlight luminance calculator 210 is used for local dimming configuration, and the pixel compensator 220 is used for image data compensation.

Figure 3:
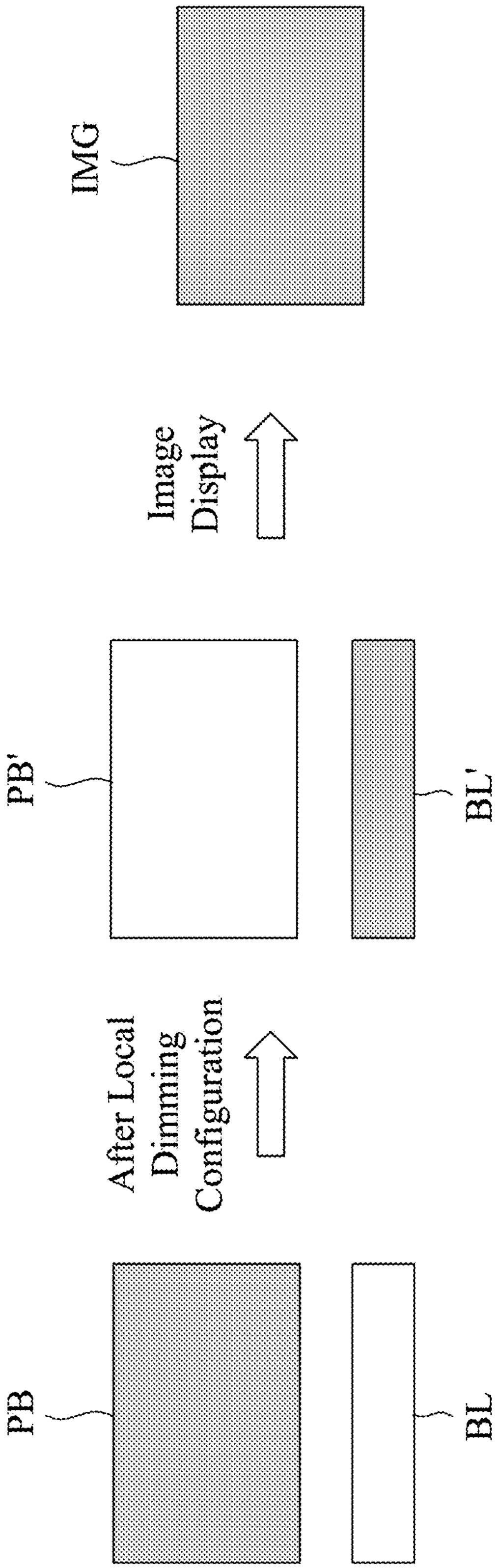
FIG. 3, which exemplarily illustrates image display with local dimming configuration as well as image data compensation for image display of the LCD panel in FIG. 1 by utilizing the local dimming control circuit in FIG. 2.

Also referring to FIG. 3, which exemplarily illustrates image display with local dimming configuration as well as image data compensation for image display of the LCD panel 110 by utilizing the local dimming control circuit 200. If the local dimming configuration is not activated, the LCD panel 110 display an image according to original pixel data PB of the input image data, and the backlight module 160 illuminates backlight BL with backlight zones thereof simultaneously turned on and off, which is power-consuming and would result in light leakage when displaying a dark image. After the local dimming configuration is activated, the backlight luminance calculator 210 calculates a luminance table corresponding to the backlight zones of the backlight module 160 from the input image data and the arrangement of the backlight zones of the backlight module 160, and then transmits a local dimming data signal with information of the luminance table to the backlight control circuit 150, such that the backlight control circuit 150 controls the backlight zones of the backlight module 160 independently for illuminating backlight BL' according to the luminance table. In addition, the pixel compensator 220 calculates a compensation gain Gn for the input image data according to the luminance table, and then performs compensation for the input image data by multiplying the gray level of each pixel in the LCD panel 110 with the compensation gain Gn to generate compensated pixel data PB'. As such, an image IMG displayed on the display apparatus 100 according to the compensated pixel data PB' and the backlight BL' is near to that displayed on the display apparatus 100 according to the original pixel data PB and the backlight BL for a viewer; that is, the gamma value of the display apparatus 100 can keep at about 2.2 after the local dimming configuration is activated. With the local dimming mechanism described above, the power consumption can be reduced, and as well the contrast ratio may be increased.

Figure 4:
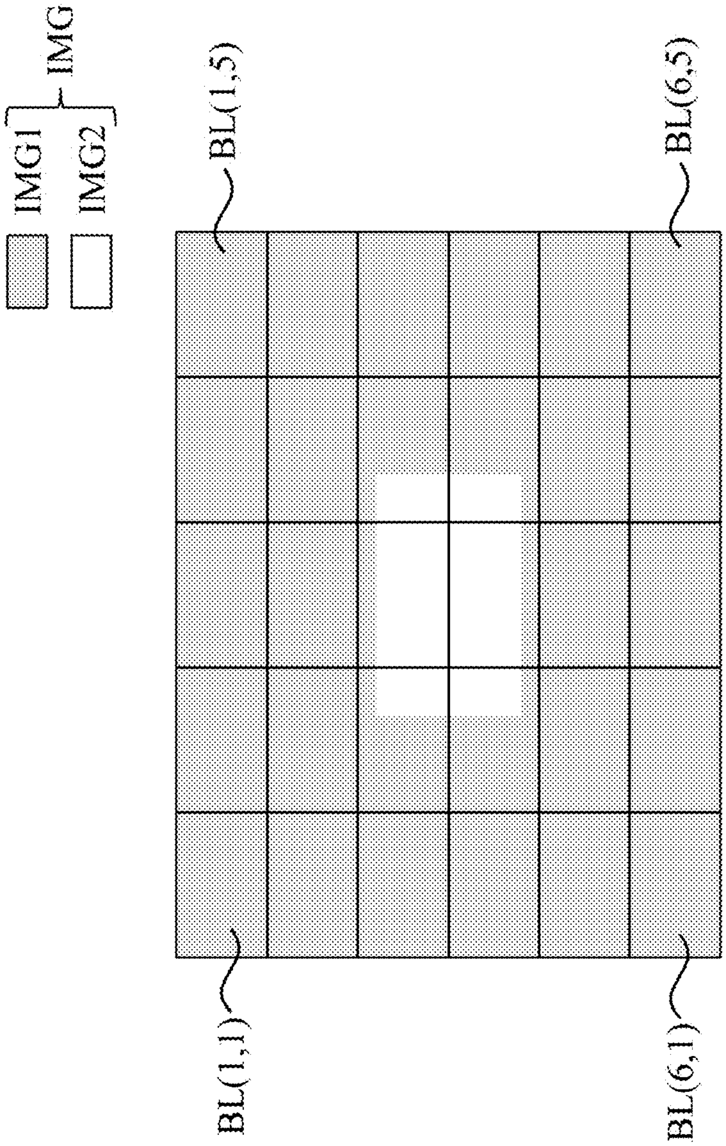
FIG. 4 exemplarily shows an image to be displayed on the display apparatus in FIG. 1 and backlight zones of the backlight module in FIG. 1.

However, for some special image patterns, such as an image with one or more bright objects (e.g. characters or a rectangular box) and a dark background (e.g. of a gray color), a dark halo phenomenon would occur when displaying the image by the display apparatus 100 that adopts the dimming mechanism described above. The dark halo phenomenon is that the gray level of the pixels in a dark part of the image and near the boundary between the dark part and a bright part in the image becomes less than that of the other pixels in the dark part the pixel data are compensated. FIG. 4 exemplarily shows an image IMG to be displayed on the display apparatus 100 and backlight zones BL(1,1)-BL(6,5) of the backlight module 160 corresponding to the image IMG. The backlight zones BL(1,1)-BL(6,5) are arranged in an array. The image shown in FIG. 4 consists of an outer image part IMG1 and an inner image part IMG2 of the image IMG; the outer image part IMG1 is a dark background of the image, while the inner image part IMG2 is a bright object of the image. The outer image part IMG1 has a first color while the inner image part IMG2 has a second color which is relatively bright in comparison with the first color. In some examples, the first and second colors are gray and white, respectively.

Figure 5A:
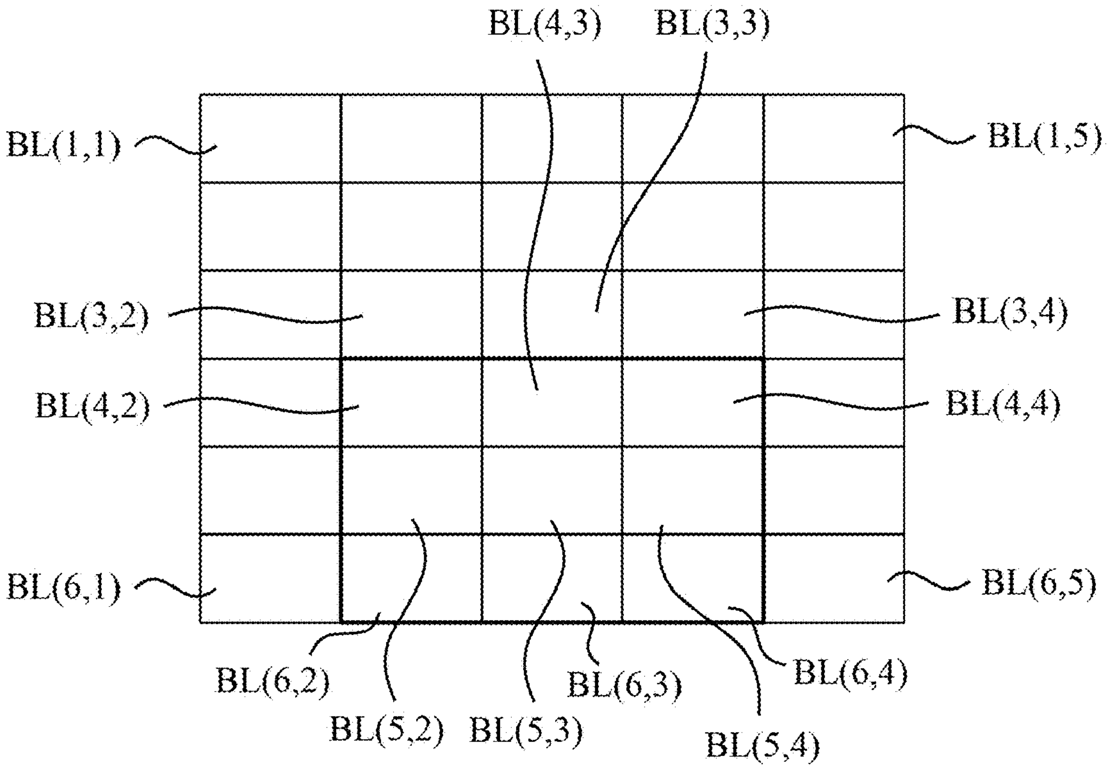
FIG. 5A shows the backlight zones of the backlight module in FIG. 1 for performing pixel data compensation.
Figure 5B:
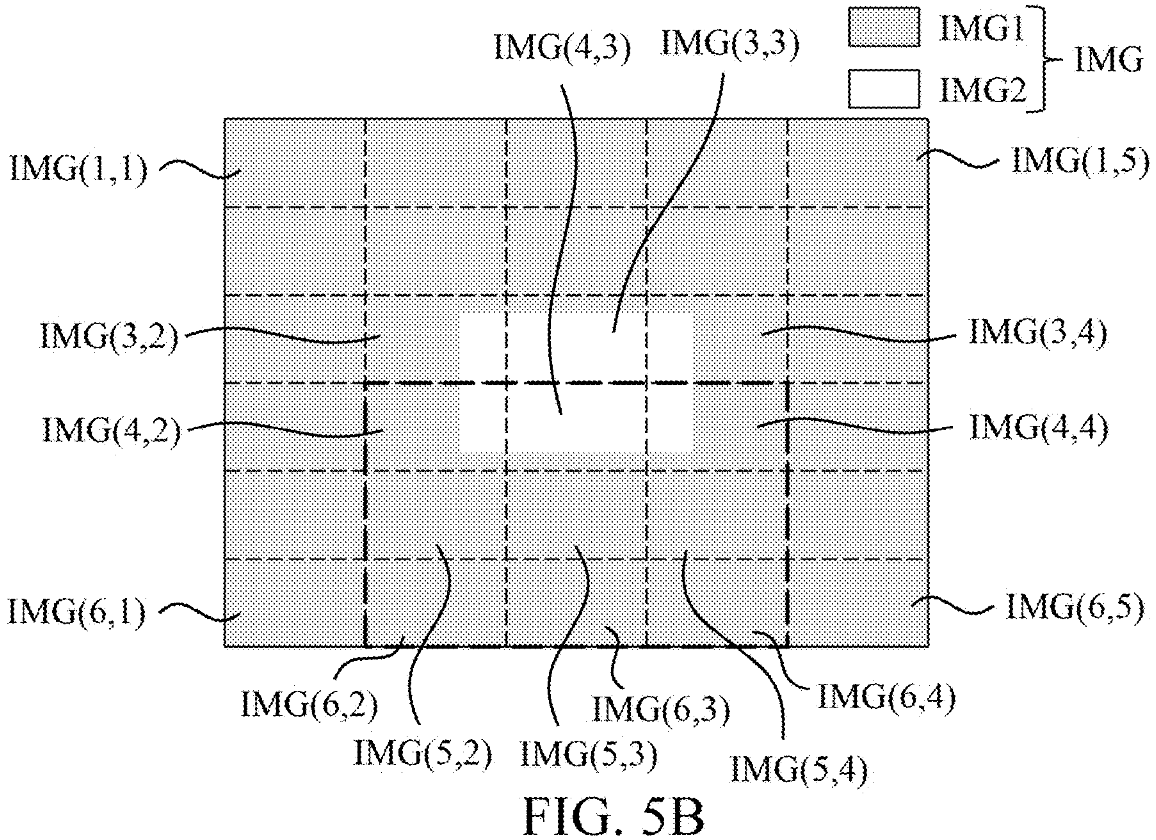
FIG. 5B shows image areas respectively corresponding to the backlight zones shown in FIG. 5A.

Also referring to FIGS. 5A and 5B, image areas IMG(1, 1)-IMG(6,5) of the image IMG respectively correspond to the backlight zones BL(1,1)-BL(6,5); the backlight zones BL(3,2)-BL(3,4) and BL(4,2)-BL(4,4), which respectively correspond to the image areas IMG(3,2)-IMG(3,4) and IMG(4,2)-IMG(4,4), map to the outer image part IMG1 as well as the inner image part IMG2, while the other backlight zones map only to the outer image part IMG1. However, if the local dimming configuration described above is activated, the gray levels of the pixels in the outer image part IMG1 and near the boundary between the outer image part IMG1 and the inner image part IMG2 become less than the gray levels of the other pixels in the outer image part IMG1 (e.g. the gray levels of the pixels in the outer image part IMG1 and corresponding to the backlight zones BL(4,2)-BL(4,4) become less than the gray levels of the pixels in the outer image part IMG1 and corresponding to the backlight zones BL(6,5)), resulting in dark halo phenomenon when displaying such type of image, which adversely affects user experiences.

Figure 6:
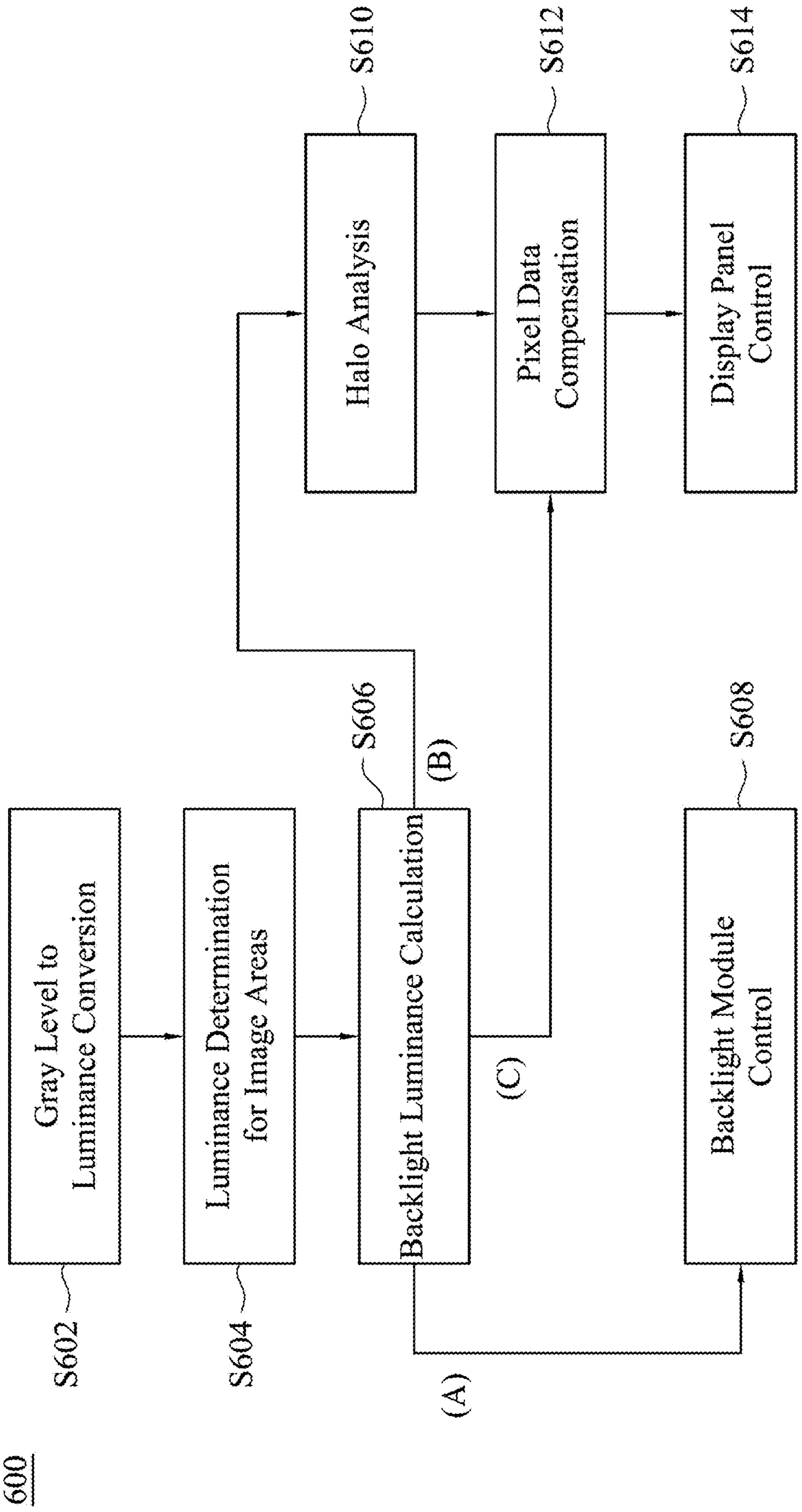
FIG. 6 is a flowchart of a local dimming control method in accordance with some embodiments of the invention.

The local dimming control circuit 200 according to the embodiments of the invention can avoid such dark halo phenomenon by further compensating for pixels with low gray levels and near the boundary between a dark image area and a bright image area of an image. FIG. 6 is a flowchart of a local dimming control method 600 in accordance with some embodiments of the invention. The local dimming control method 600 will be described in combination with the display apparatus 100 and the local dimming control circuit 200 for displaying the image shown in FIG. 4.

In Step S602, the gray levels of the red, green and blue colors for the pixels in the image data are converted into luminance values for the pixels. The luminance value for a pixel is the maximal gray level among the gray levels of the red, green and blue colors for that pixel. For example, if the gray levels of the red, green and blue colors for a pixel is (127,191,223), then the luminance value for that pixel is MAX(127,191,223)=223, which is the same as the gray level of the blue color.

In Step S604, the image areas respectively corresponding to the backlight zones are each determined to be a low-luminance image area or not. An example for determining whether the image area is a low-luminance image area is described as follows. In the beginning of the determination for each image area, a first counting value LC and a second counting value VC are initialized to be zero, and a first threshold LTH and a second threshold VTH are predetermined according to an image display condition. In an image area corresponding to the backlight zone, if the difference between the luminance values of two adjacent pixels is less than the first threshold LTH, then the first counting value LC is incremented by 1; if the maximum difference of the gray levels of the red, green and blue colors for a pixel is less than the second threshold VTH, then the second counting value VC is incremented by 1. All pixels in the same image area are calculated in these manners. Afterwards, the image area is then determined to be a low-luminance image area or not. If the first counting value LC is less than a first target value LT and the second counting value VC is then a second target value VT, then the image area is determined to be a low-luminance image area; else, the image area is determined not to be a low-luminance image area.

In Step S606, a local dimming algorithm is adopted to calculate luminance values for each backlight zone according to the image. The luminance values may be pulse-width modulation (PWM) duty cycle values with, for example, the same voltage and different duty cycles for controlling intensities of the backlight zones. Then, a local dimming data signal with the luminance values is transmitted to the backlight module 160 for controlling illumination of each backlight zone (Path A), the determination results (low-luminance or not) of the image areas are used for halo analysis (Path B), and the gray levels of the pixels are used for calculation for pixel data compensation (Path C).

In Step S608, the backlight control circuit 150 controls illumination of the backlight module 160 based on the local dimming data signals. The luminance intensities of the backlight zones of the backlight module 160 may be determined by the duty cycles of the local dimming data signals.

In Step S610, a halo analysis is performed on the image. In particular, if an image area is determined to be a low-luminance image area, then the luminance intensity of the backlight zone corresponding to this image area is further compared with the luminance intensities of the backlight zones respectively corresponding to the neighboring image areas by referring to the luminance table of the backlight module 160.

In Step S612, pixel data compensation is performed on the image. In particular, if an image area is determined to be a low-luminance image area and the luminance intensity of the backlight zone corresponding to another image area neighboring the low-luminance image area is greater than the luminance intensity of the backlight zone corresponding to the low-luminance image area, then the pixel data compensation for the high-luminance pixels in the neighboring image area (e.g., with gray levels higher than that of the pixels in the low-luminance image area) is less than the pixel data compensation for the low-luminance pixels in the neighboring image area (e.g., with gray levels identical to or near that of the pixels in the low-luminance image area). For example, the high-luminance pixels in the neighboring image area are compensated by multiplying with a compensation gain Gn1, and the low-luminance pixels in the neighboring image area are compensated by multiplying with a compensation gain Gn2 which is greater than the compensation gain Gn1. The compensation gain Gn1 for the high-luminance pixels in the neighboring image area is determined based on the luminance values for the backlight zones, and/or the compensation gain Gn2 for the low-luminance pixels in the neighboring image area is positively correlated with the number of high-luminance pixels in the neighboring image area.

For example, as shown in FIGS. 5A and 5B, the image area corresponding to the backlight zone BL(5,3) is determined as a low-luminance image area, and thus the luminance intensity of the backlight zone BL(5,3) is then compared with the luminance intensities of the backlight zones neighboring the backlight zone BL(5,3) (including the backlight zones BL(4,2), BL(4,3), BL(4,4), BL(5,2), BL(5,4), BL(6,2), BL(6,3) and BL(6,4)). Because there are more pixels with high gray level in each of the image areas IMG(4,2), IMG(4,3) and IMG(4,4), the luminance intensities of the backlight zones BL(4,2), BL(4,3) and BL(4,4) are greater than the luminance intensity of the backlight zone BL(5,3). Therefore, the gray level of the low-luminance pixels in the image part IMG2 and in the image areas IMG(4,2), IMG(4,3) and IMG(4,4) neighboring the image area IMG(5,3) is compensated by multiplying with the compensation gain Gn2, and the gray level of the high-luminance pixels in the image part IMG1 and in the image areas IMG(4,2), IMG(4,3) and IMG(4,4) is compensated by multiplying with the compensation gain Gn1 which is less than the compensation gain Gn2.

Figure 5C:
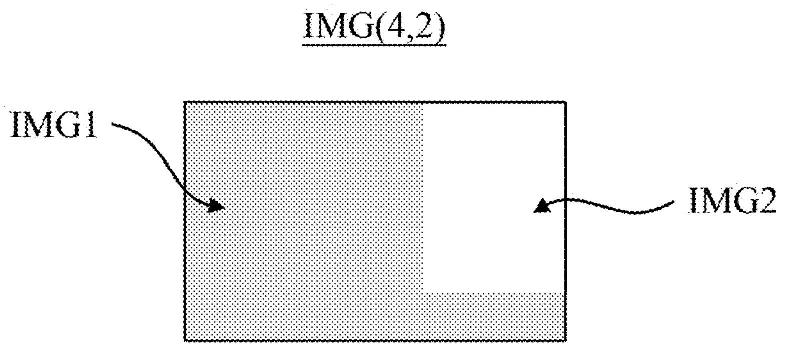
FIGS. 5C and 5D are enlarged views of respective image areas shown in FIG. 5B.
Figure 5D:
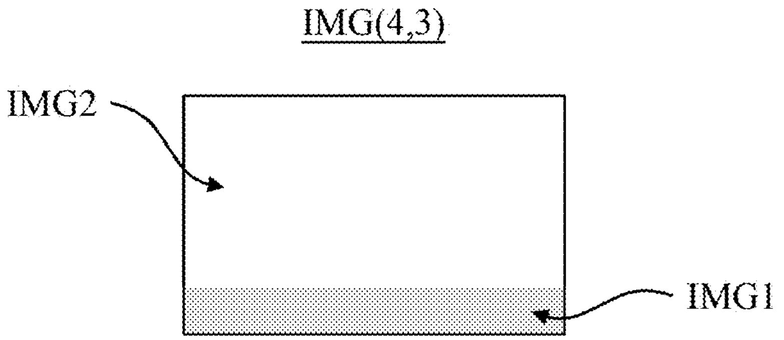

The compensation gain Gn2 may be determined according to the number of high-luminance pixels in each image area. For example, as shown in FIGS. 5C and 5D, the area of the image part IMG2 in the image area IMG(4,3) (e.g. the number of high-luminance pixels in the image area IMG(4, 3)) is greater than the area of the image part IMG2 in the image area IMG(4,2), and thus the compensation gain Gn2 for the low-luminance pixels in the image area IMG(4,3) is greater than that for the low-luminance pixels in the image area IMG(4,2).

In Step S614, the LCD panel 110 is controlled to display the image with the compensated gray levels of the pixels. Steps S608 and S614 may be performed at the same time for image display for eliminating dark halo phenomenon.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A display apparatus, comprising:

a backlight module having a plurality of backlight zones;

a liquid crystal display (LCD) panel over the backlight module; and a local dimming control circuit configured to generate a local dimming data signal for the backlight module and compensated pixel data for the LCD panel based on image data and an arrangement of the backlight zones of the backlight module, the image data having a plurality of image areas respectively corresponding to the backlight zones, and the local dimming control circuit comprising:

a backlight luminance calculator that performs local dimming configuration by calculating a luminance table with luminance values respectively corresponding to the backlight zones from the image data to generate the local dimming data signal; and a pixel compensator that performs first and second pixel compensations on the image data according to the luminance table to generate the compensated pixel data;

wherein for a first image area of the image areas being a low-luminance image area and a luminance intensity of a first backlight zone of the backlight zones corresponding to the first image area being less than a luminance intensity of a second backlight zone corresponding to a second image area of the image areas neighboring the first image area, the pixel compensator performs the first pixel compensation for high-luminance pixels in the second image area by multiplying a first gray level of the high-luminance pixels in the second image area with a first compensation gain, and performs the second pixel compensation for low-luminance pixels in the second image area by multiplying a second gray level of the low-luminance pixels in the second image area with a second compensation gain which is greater than the first compensation gain, wherein the second compensation gain is positively correlated with the number of high-luminance pixels in the second image area.

2. The display apparatus of claim 1, wherein the first compensation gain is determined based on the luminance values for the backlight zones.

3. The display apparatus of claim 1, wherein the local dimming data signal has pulse-width modulation (PWM) duty cycle values respectively corresponding to the backlight zones of the backlight module.

4. The display apparatus of claim 1, wherein the local dimming control circuit is integrated in a timing controller of the display apparatus.

5. The display apparatus of claim 1, wherein each backlight zone of the backlight module has a plurality of light emitting diodes (LED).

6. A local dimming control circuit, comprising:

a backlight luminance calculator configured to generate a local dimming data signal for a backlight module and compensated pixel data for a LCD panel based on image data and an arrangement of backlight zones of the backlight module associated with the LCD panel, the image data having a plurality of image areas respectively corresponding to the backlight zones, and the backlight luminance calculator performing local dimming configuration by calculating a luminance table with luminance values respectively corresponding to the backlight zones from the image data to generate the local dimming data signal; and a pixel compensator configured to determine whether a first image area of the image areas is a low-luminance image area and, in response to a determination that the first image area is a low-luminance image area and a luminance intensity of a first backlight zone of the backlight zones corresponding to the first image area is less than a luminance intensity of a second backlight zone corresponding to a second image area of the image areas neighboring the first image area, perform first and second pixel compensations on the image data according to the luminance table to generate the compensated pixel data, wherein the pixel compensator performs first pixel compensation for high-luminance pixels in the second image area by multiplying a first gray level of the high-luminance pixels in the second image area with a first compensation gain, and performs second pixel compensation for low-luminance pixels in the second image area by multiplying a second gray level of the low-luminance pixels in the second image area with a second compensation gain which is greater than the first compensation gain, wherein the second compensation gain is positively correlated with the number of high-luminance pixels in the second image area.

7. The local dimming control circuit of claim 6, wherein the first compensation gain is determined based on luminance values for the backlight zones.

8. The local dimming control circuit of claim 6, wherein the local dimming data signal has PWM duty cycle values respectively corresponding to the backlight zones of the backlight module.

9. A local dimming control method for a display apparatus having an LCD panel and a backlight module with a plurality of backlight zones, the local dimming control method comprising:

generating a local dimming data signal for the backlight module and compensated pixel data for a LCD panel based on image data and an arrangement of the backlight zones of a backlight module associated with the LCD panel, the image data having a plurality of image areas respectively corresponding to the backlight zones;

determining whether a first image area of the image areas is a low-luminance image area; and in response to a determination that the first image area is a low-luminance image area and a luminance intensity of a first backlight zone of the backlight zones corresponding to the first image area is less than a luminance intensity of a second backlight zone corresponding to a second image area of the image areas neighboring the first image area, performing first pixel compensation for high-luminance pixels in the second image area by multiplying a first gray level of the high-luminance pixels in the second image area with a first compensation gain, and performing second pixel compensation for low-luminance pixels in the second image area by multiplying a second gray level of the low-luminance pixels in the second image area with a second compensation gain which is greater than the first compensation gain, wherein the second compensation gain is positively correlated with the number of high-luminance pixels in the second image area.

10. The local dimming control method of claim 9, wherein the first compensation gain is determined based on luminance values for the backlight zones.

11. The local dimming control method of claim 9, wherein the image data is an image with one or more bright objects and a dark background.

12. The local dimming control method of claim 9, wherein the local dimming data signal has PWM duty cycle values respectively corresponding to the backlight zones of the backlight module.

* * * * *